No. 834,550. PATENTED OCT. 30, 1906.
A. YUGSTROM.
LOAD ELEVATOR.
APPLICATION FILED JUNE 21, 1905.
2 SHEETS—SHEET 1.
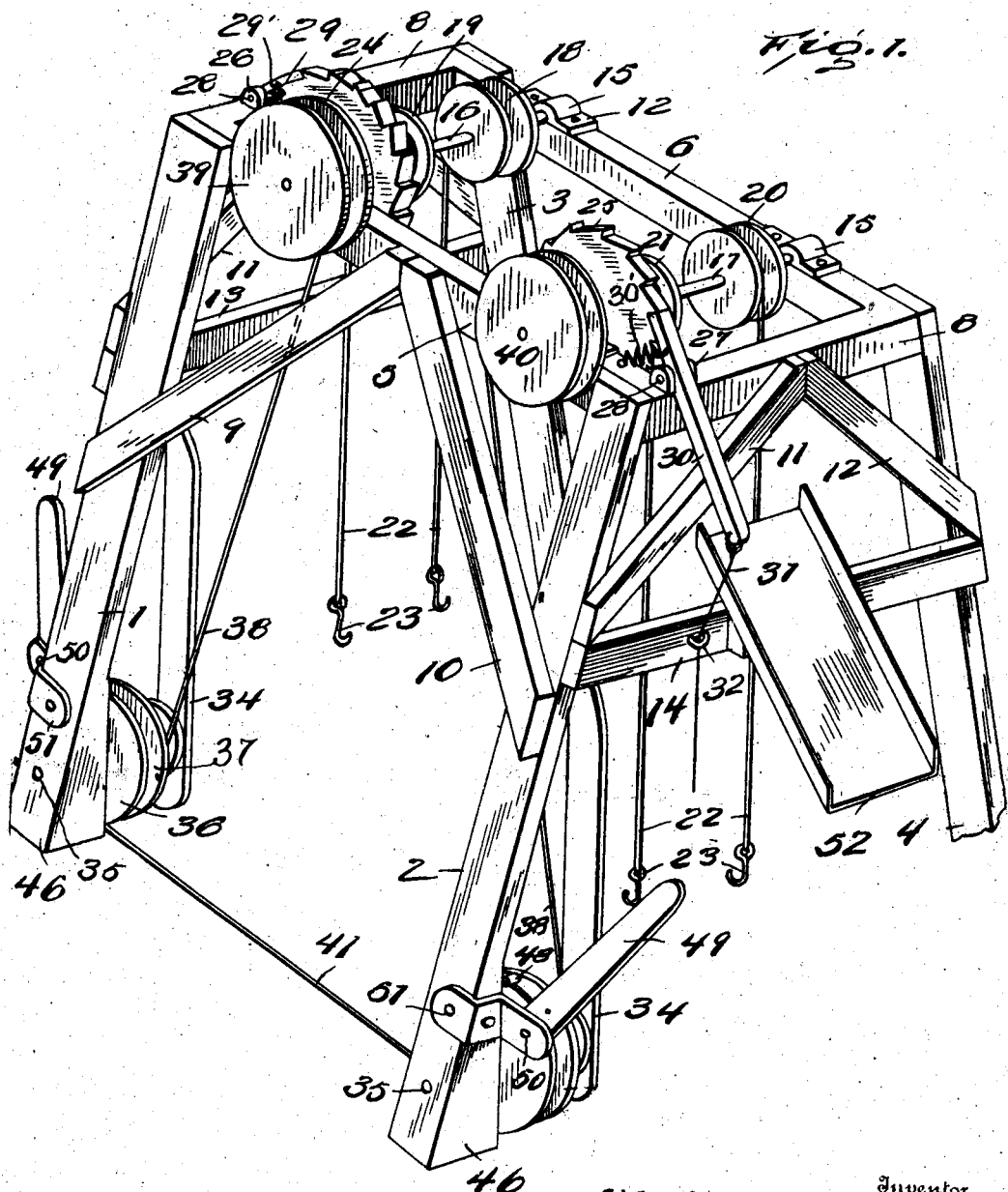

No. 834,550. PATENTED OCT. 30, 1906.
A. YUGSTROM.
LOAD ELEVATOR.
APPLICATION FILED JUNE 21, 1905.
2 SHEETS—SHEET 2.
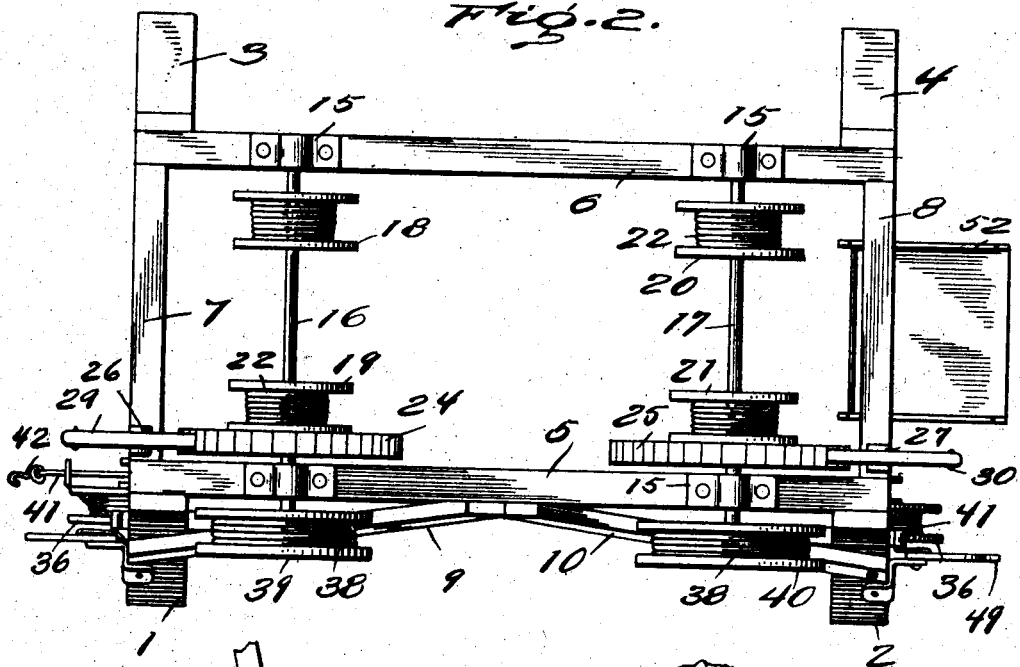
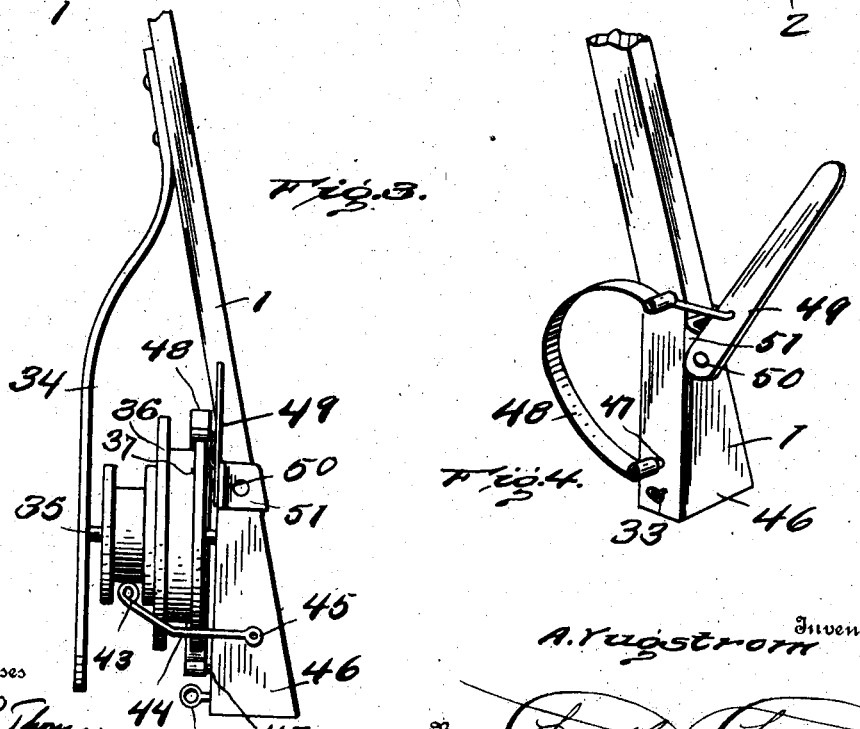
Witnesses
G. R. Thomas
E. M. Bolford
Inventor
A. Yugstrom
By Chandler & Chandler
Attorneys

UNITED STATES PATENT OFFICE.

AXEL YUGSTROM, OF LINDSBORG, KANSAS.

LOAD-ELEVATOR.

No. 834,550.

Specification of Letters Patent.

Patented Oct. 30, 1906.

Application filed June 21, 1905. Serial No. 266,320.

*To all whom it may concern:*

Be it known that I, AXEL YUGSTROM, a citizen of the United States, residing at Lindsborg, in the county of McPherson, State of Kansas, have invented certain new and useful Improvements in Load-Elevators; and I do hereby declare the following to be a full, clear, and exact description of the invention, such as will enable others skilled in the art to which it appertains to make and use the same.

This invention relates to load-elevators.

One object of the invention is to provide means for unloading wagons by lifting the body of the latter from its running-gear and dumping the load therefrom into a suitable bin or receptacle.

Another object of the invention resides in the provision of a comparatively simple, inexpensive, durable, and efficient means for positively elevating vehicle-bodies for the dumping therefrom of grain or other material into a receptacle.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of the invention. Fig. 2 is a top plan view. Fig. 3 is a detail view of one of the legs, illustrating the connection of the hanger therewith for the mounting of one of the double pulleys. Fig. 4 is a detail view of one of the brakes.

Referring now more particularly to the accompanying drawings, the invention comprises a frame consisting of legs 1, 2, 3, and 4, upper side beams 5 and 6, and upper end beams 7 and 8, there being braces 9 and 10, connecting the side pieces 5 and 6 with the corresponding legs. Braces 11 and 12 are connected to each end piece 7 and 8 and with the corresponding legs, there being additional braces 13 and 14, extending across the ends of the frame and connecting the corresponding legs immediately beneath the corresponding cross-pieces 7 and 8.

Journaled in suitable bearings 15, arranged upon the upper faces of the side pieces 5 and 6, are shafts 16 and 17, the shafts being arranged at opposite ends of the frame. Mounted upon the shaft 16 are pulley-wheels 18 and 19, while the shaft 17 has pulley-wheels 20 and 21 secured thereupon, all of the pulley-wheels being provided with side flanges to form grooves to guide the hoisting-cables 22, connected therewith in any suitable manner, each cable—there being four of them—having a hook 23 connected at its lower or free end. Arranged adjacent the pulley-wheels 19 and 21 are ratchet-wheels 24 and 25, respectively, the said ratchet-wheels being also confined within the end and side pieces at the top of the frame. Pivoted in suitable brackets 26 and 27 by means of suitable pivot-pins 28 are levers 29 and 30, which are designed to engage the teeth of the corresponding ratchet-wheels 24 and 25, there being suitable helical or other springs 29' and 30', designed to engage the inner ends of the respective levers, as shown, to hold the inner ends of the said levers normally in engagement with the corresponding ratchet-wheels. The outer end of each lever 29 and 30 has connected thereto a suitable flexible connection 31 to permit a pull upon the outer ends of the levers to disengage them from the ratchet-wheels when desired, it being seen that the said flexible connections are guided through the guide 32, secured one each to the braces 13 and 14.

Secured to the inner faces of the legs 1 and 2 of the frame are hangers 34, between each of which and the respective legs is a shaft 35, upon each of which shafts is mounted a double pulley 36. Mounted in the inner side 37 of each double pulley 36 and secured to the periphery in any suitable manner is a rope 38, whose upper end is connected to the respective pulleys 39 and 40 of the respective shafts 16 and 17. Connected to the outer side of each double pulley is another cord 41, the said cord having each of its ends connected to the outer sides of said pulley-wheels with its bight portion having connection with a hook 42, designed to be engaged with a whiffletree (not shown) whereby the said double pulley 36 may be rotated upon the pulley of the said rope 41, the rope being guided from the left-hand double pulley 36 by means of an eye 43, arranged at the end at a right angle to the body 44 of a bracket 45, which is secured in any suitable manner to the outer side face of the leg 1, the rope leading from the other double pulley 36 being guided through the guide 33, secured also to the leg 1. It will be observed that the lower ends of the legs 1 and 2 are increased in thickness, as at 46, and that each one of these legs 1 and 2 has a projection 47 directed toward the corresponding legs 3 and 4, there being a brake-band 48 secured to each projection 47 and having connection with the lever 49, pivoted, as at 50, to the bracket 51, which latter is secured in any suitable manner to the respective legs 1 and 2.

When it is desired to unload a vehicle of grain or other material and discharge it into another receptacle, (not shown,) it is simply necessary to engage the hooks of the hoisting ropes with the body of the vehicle. The horse or horses should then be released from the vehicle and used for hoisting purposes. In other words, after detaching the animals from the vehicle, it is simply necessary to engage the hook 42 of the rope 41 with the swingletree or whiffletree (not shown) and start the horses forwardly. The forward movement of the animals will rotate the double-pulley wheels 36 and through the rope connections 38, which are connected to the pulley-wheels 39 and 40, will cause the shafts 16 and 17 to rotate, and consequently lift the body of the vehicle from the running-gear by reason of the pulleys connected to the shaft at the top of the frame, the said body being elevated until it reaches the chute 52, which latter is secured upon the brace 14 and down which it may slide to a bin or receptacle. (Not shown.)

In order to prevent the body being carried too far upwardly, the brakes at the ends of the frame may be employed for locking the double-pulley wheels against movement. Of course in order to incline the body of the vehicle when it has reached the predetermined height within the frame the brake-lever secured to the leg 2 may be operated to prevent further upward movement of the hoisting-ropes at the rear of the frame, while the opposite hoisting-ropes may be permitted to move upwardly a little farther to incline the body of the vehicle and insure the discharge of all the grain or material from the latter. It is obvious that a pull upon the ropes connected with the levers 29 and 30 will disengage the inner ends of the levers from the ratchet-wheels 24 and 25 and permit of a ready lowering of the body of the vehicle upon its running-gear.

What is claimed is—

1. A hoisting device comprising a frame, oppositely-disposed rotatable shafts mounted in the top of the frame, pulley-wheels connected with the said shafts, a ratchet-wheel connected to each shaft, hoisting-cables connected to some of the said pulleys, double-pulley wheels mounted near the bottom of the frame, a connection between each double-pulley and one of the pulleys of each shaft, a rope connected with each of said double pulleys, means for braking the double-pulleys, levers adapted to prevent backward movement of the aforesaid ratchet-wheels, and means whereby said levers may be disengaged from the ratchet-wheels.

2. A hoisting device comprising a frame, oppositely-disposed shafts rotatably mounted in the top of said frame, each shaft having pulleys and a ratchet-wheel secured thereto and mounted within the frame, each shaft also having a pulley mounted exteriorly of the frame, hoisting-cables connected to the pulleys arranged within the frame, double-pulley wheels mounted in the bottom of the frame, a rope connection between the said double pulleys and the pulleys mounted upon the said shafts exteriorly of the frame, a rope connected to said double pulleys to rotate the same, brakes secured to the frame for braking the double-pulley wheels against rotation, a lever adapted to prevent backward rotation of the ratchet-wheels, means whereby the levers may be moved out of engagement with the ratchet-wheels, and a chute connected to one end of the frame near the top thereof.

In testimony whereof I affix my signature in presence of two witnesses.

AXEL YUGSTROM.

Witnesses:
 JOHN F. HANSON,
 THEODORE OLSON.